US006923897B1

United States Patent
Schmidt et al.

(10) Patent No.: US 6,923,897 B1
(45) Date of Patent: Aug. 2, 2005

(54) METHOD FOR PRODUCING ELECTROLYTICALLY COATED COLD ROLLED STRIP, PREFERABLY FOR USE IN THE PRODUCTION OF BATTERY SHEATHS, AND BATTERY SHEATH PRODUCED ACCORDING TO THIS METHOD

(75) Inventors: Ferdinand Schmidt, Duesseldorf (DE); Hans-Guenter Steinmann, Duesseldorf (DE); Karlfried Pfeifenbring, Duisberg (DE); Werner Olberding, Velbert (DE); Dagmar Petrick, Solingen (DE)

(73) Assignee: Hille & Mueller GmbH, Duesseldorf (DE)

( * ) Notice: Subject to any disclaimer, the term of this patent is extended or adjusted under 35 U.S.C. 154(b) by 247 days.

(21) Appl. No.: 10/110,427

(22) PCT Filed: Oct. 13, 2000

(86) PCT No.: PCT/EP00/10071

§ 371 (c)(1), (2), (4) Date: Apr. 12, 2002

(87) PCT Pub. No.: WO01/27355

PCT Pub. Date: Apr. 19, 2001

(30) Foreign Application Priority Data

Oct. 14, 1999 (DE) ......................................... 199 49 549

(51) Int. Cl.$^7$ ................................................ C25D 5/00
(52) U.S. Cl. ....................... 205/113; 205/112; 205/109; 205/181; 205/190; 205/191; 205/271; 205/269; 205/255; 408/544
(58) Field of Search ................................. 205/109, 112, 205/113, 181, 170, 191, 271, 269, 255; 428/544

(56) References Cited

U.S. PATENT DOCUMENTS

| 3,922,209 A | 11/1975 | Passal |
| 3,969,399 A | 7/1976 | Passal |
| 4,756,816 A | 7/1988 | Liao |
| 2001/0006748 A1 * | 7/2001 | Ohmura et al. ............. 429/176 |

FOREIGN PATENT DOCUMENTS

| DE | 1 953 707 | 11/1970 |
| EP | 0 361 451 A1 | 4/1990 |
| EP | 0 447 044 A1 | 9/1991 |
| EP | 0 629 009 B1 | 8/1997 |
| EP | 0 670 916 B1 | 8/1997 |
| EP | 0 809 307 A2 | 11/1997 |
| GB | 1 510 079 | 5/1978 |

* cited by examiner

*Primary Examiner*—Roy King
*Assistant Examiner*—Lois Zheng
(74) *Attorney, Agent, or Firm*—Hahn Loeser + Parks LLP

(57) ABSTRACT

The invention relates to a method for producing an electrolytically coated cold rolled strip, preferably for use in the production of battery sheaths. The cold rolled strip is provided with a cobalt or a cobalt alloy layer by an electrolytic method. The aim of the invention is to provide a battery sheath with low values for the electric contact resistance between the cathode substance of the battery and the inner surface of the battery sheath. To this end, organic substances m added to the electrolyte during coating that produce decomposition products, said decomposition produces and/or reaction products of said decomposition products with other components of the electrolytic bath being deposited on the strip material as a brittle layer along with the cobalt or the cobalt alloy.

32 Claims, 2 Drawing Sheets

FIG. 3

Figure 1:
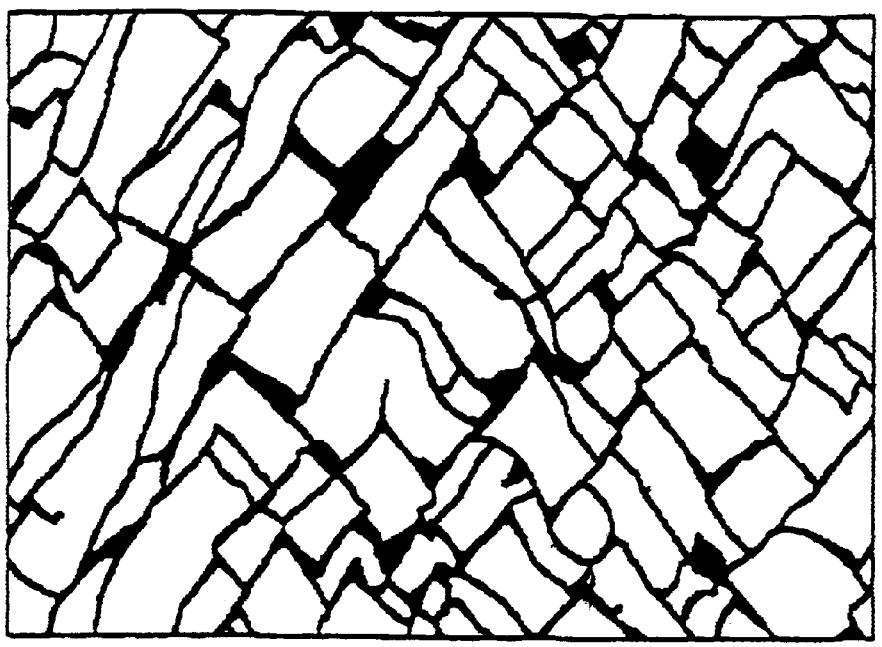

Examples of Co Deposits (at room temperature) | Examples of Ni deposits | Example of fissure patterns at various current densities

| Example No. | 1 | 2 | 3 | 4 | 5 | 6 | 7 | 8 | 9** | 10 | 11 | 12 | 13 |
|---|---|---|---|---|---|---|---|---|---|---|---|---|---|
| Organic ingredient | (V4) | (V1) | (V3) | (V2) | (V2) | (V4) | (V1) | (V3) | (V2) | (V3) | (V3) | (V3) | (V3) |
| pH value | 3.3 | 3.2 | 1.6 | 3.3 | 3.3 | 2.6 | 3.6 | 2.6 | 3.8 | 2.6 | 2.6 | 2.6 | 2.6 |
| Temperature in °C | RT | RT | RT | RT | RT | 60 | 60 | 60 | 60 | 60 | 60 | 60 | 60 |
| Chloride content in g/l | 30 | 26 | 24 | 28 | 28 | 26 | 34 | 28 | 27 | 28 | 28 | 28 | 28 |
| Concentration | 12 ml/l | 1 ml/l | 0.8 g/l | 2.5u12 ml/l | 2.5u12 ml/l | 12 ml/l | 6 ml/l | 0.9 g/l | 6u12 ml/l | 0.8 g/l | 0.8 g/l | 0.8 g/l | 0.8 g/l |
| Current density A/dm² | 6 | 6 | 6 | 6 | 6 | 8 | 8 | 8 | 8 | 2 | 8 | 20 | 50 |
| Behavior | ◎ | ◆ | ○ | ◆ | ◆ | ⊘ | ● | ⊘ | ◎ | ⊘ | ⊘ | ○ | ◎ |
| Edge length (μm) | 20 | 40 | 30 | 40 | 40 | - | 40 | - | 40 | - | - | 20 | 20 |

Examples of Co Deposits (at 60°C) | "Shining cobalt" on "shining nickel"

| Example No. | 14 | 15 | 16 | 17 | 18 | 19 | 20 | 21 | 22 | 23 | 25 | 26 | 27 |
|---|---|---|---|---|---|---|---|---|---|---|---|---|---|
| Organic ingredient | (V4) | (V1) | (V3) | (V2) | (V4) | (V4) | (V4) | (V4) | (V4) | (V3) | (V4) | (V2) | (V2) |
| pH value | 3.2 | 3.0 | 2.9 | 4.0 | 3.2 | 3.2 | 3.2 | 3.2 | 3.2 | 3.5 | 3.2 | 3.5 | 3.5 |
| Temp in °C | 60 | 60 | 60 | 60 | 60 | 60 | 60 | 60 | 60 | 60 | 60 | RT | 60 |
| Chloride content in g/l | 32 | 35 | 32 | 32 | 30 | 30 | 30 | 30 | 10 | 30 | 50 | 30 | 30 |
| Concentration | 12 ml/l | 1 ml/l | 0.8 g/l | 1u12 ml/l | 2 ml/l | 20 ml/l | 4 | 12 ml/l | 12 ml/l | 0.8 g/l | 12 ml/l | 1ul/ml/l | 1ul/ml/l |
| Current density A/dm² | 8 | 8 | 8 | 8 | 8 | 8 | 8 | 40 | 8 | 8 | 8 | 8 | 8 |
| Behavior | ◎ | ◆ | ⊘ | ● | ○ | ◎ | ◎ | ◎ | ⊘ | ○ | ● | ○ | ◆ |
| Edge Length (μm) | 20 | 30 | | 30 | 5 | 20 | 15 | 15 | | 20 | 10 | 10 | 20 |

Behavior: ⊘: not cracked; ○: slightly cracked; ◎: cracked; ●: strongly cracked; ◆: very strongly cracked
**: The base material was a material produced with a layer of 0.8 μm according to example 9; The "shining Co" layer is 0.2 μm thick.

METHOD FOR PRODUCING ELECTROLYTICALLY COATED COLD ROLLED STRIP, PREFERABLY FOR USE IN THE PRODUCTION OF BATTERY SHEATHS, AND BATTERY SHEATH PRODUCED ACCORDING TO THIS METHOD

This invention relates first to a method for producing electrolytically coated cold band, preferably used for the manufacturing of battery shells, during which the cold band is electrolytically coated with a layer of cobalt or cobalt alloy.

BACKGROUND OF THE ART

In general, battery shells are manufactured of a cold band electrolytically coated with multiple layers. Document EP 0 629 009 B1 describes a cold band as well as a method for producing cold band electrolytically plated with nickel that is characterized by a favorable behavior during a subsequent drawing and ironing process. In order to improve the effective contact surface between the inner side of the battery shell and the cathode material, a hard coating of a nickel layer is deposited on the side of the cold band that will later form the inner side of the battery shell. During the drawing and ironing process, cracks form in this layer resulting in an enlargement of the contact surface.

A similar material is described in document EP 0 809 307 A2. The side of the band material that will later form the inner side of the battery shell is coated with a hard material layer, whereas the other side—which will later form the outer side of the battery shell—is coated with a relatively soft metal layer. To achieve a hard metal coating, this document proposes electroplating process with an alloy on the nickel basis. Document EP 0 809 307 A2 indicates various examples of the hardness of thus produced alloys. It also mentions the possibility to add organic ingredients to the galvanic bath; however, no indication regarding the hardness properties of layers produced with these baths is made. During the subsequent forming of the metal sheet into battery shells, brittle fractures are supposed to form in the electrolytically deposited hard alloy coating which results in an enlarged surface and, therefore, reduced electrical contact resistance between the cathode substance of the battery and the inner surface of the battery shell.

In general, the use of organic ingredients in galvanic bath has been known for a long time as documented, e.g., by U.S. Pat. No. 2,026,718 from 1936. This document describes the addition of aromatic sulfonic acids to the galvanic bath for the purpose of achieving a glossy layer.

The use of organic ingredients in galvanic nickel, cobalt, and nickel-cobalt baths for producing an improved cold band for the manufacturing of battery shells has also been known. So, e.g., document patent DE 19 53 707 A1 describes a procedure, during which layers of nickel, cobalt or of their alloys are deposited after an unsaturated, organic substance such as butyne diol has been added to the electrolyte. This document proposes deposition with inert anodes in a halogen-free bath at a current density of 83.8 A/dm$^2$, where the process is controlled in such a manner as to avoid brittle deposits.

Finally, it is known from the state of art how to deposit cobalt from a galvanic bath with the aid of organic substances in order to form, e.g., ferromagnetic layers for data carriers (see, e.g., U.S. Pat. No. 4,756,816).

SUMMARY OF THE INVENTION

The underlying task of this invention is to develop a procedure for electrolytic production of cold band that would allow—during the manufacturing of battery shells by drawing and ironing—to achieve low values of the electrical contact resistance between the cathode substance of the battery and the inner side of the cupular battery shell. Furthermore, the invention is to propose the manufacturing of a battery shell according to such procedure and by subsequent forming operation.

DETAILED DESCRIPTION OF THE PREFERRED EMBODIMENT

To resolve this task, the invention proposes, for the procedure of the initially mentioned nature, that organic substances that create decomposition products be added to the electrolyte during the coating process and that these decomposition products and/or reaction products of these decomposition products with other ingredients in the galvanic bath are deposited on the band material together with cobalt or the cobalt alloy.

Thus produced cold band is characterized in that its side coated with an electrolytic layer, if subjected to strong forming forces as they occur during drawing and ironing of the material to produce, e.g., a battery shell, shows an especially low electrical contact resistance. The cause of this phenomenon is that the brittle layer of cobalt or a cobalt alloy cracks and forms individual plates separated by fissures. Due to these fissures, the electrical contact resistance is diminished, which is why the band produced in a procedure according to this invention is especially suitable as the basis material for the manufacturing of cupular battery shells by deep-drawing or drawing and ironing, and especially for batteries with alkaline electrolytes. Compared to the current state of art, the inner side of the thus manufactured battery shell demonstrates even lower values of the electrical contact resistance between the cathode substance of the battery and the inner side of the battery shell.

In order to achieve the desired brittleness and to improve the electrical conductivity of the electrolytically produced layer, the process conditions should preferably be selected in such a manner that the resulting coating contain a cobalt share of more than 35 weight percent. Furthermore, it is advantageous if the current density of the electrolyte bath lies within a relatively narrow range of no more than 10 A/dm$^2$, preferably in a range between 6 and 8 A/dm$^2$.

Also important for the subsequent forming process of the produced galvanic coating is the chloride content in the electrolyte bath. This should be more than 24 g/l, preferably more than 30 g/l.

Another preferred version of the procedure proposes that the cobalt alloy contain the ingredients of nickel, iron, tin, indium, palladium, gold and/or bismuth that reduce the contact resistance of the subsequent battery shell manufactured by a forming process. These ingredients can be used as a simple admixture or in coatings made of more than two of these elements.

A raw material especially suited for the production of the cold band is steel with a carbon content of less than 0.20% of a thickness of 1 mm and preferably of 0.1–0.7 mm. According to a first version, the brittle coating can be deposited directly on the base material made of steel. According to a second version, the brittle coating is deposited on a layer arranged underneath and deposited previously in a galvanic process. This layer arranged underneath is preferably an electrolytically deposited, and subsequently homogenized nickel layer that demonstrates an excellent corrosion resistance. Afterwards, the material is coated with a layer of a high cobalt content with embedded decomposition products of organic ingredients. Although during the subsequent strong forming process by deep-drawing or drawing and ironing the cobalt layer cracks, such cracks do not reach all the way down to the steel base material but, rather, they are stopped by the underlying ductile nickel layer so that the corrosion resistance remains intact.

In another version, the layer according to this invention with a high cobalt content is coated with an additional layer that leads to a better surface conductivity of the battery shell manufactured from the band material by deep drawing. Suitable for such coating is, e.g., gold or palladium. In this version of the cold band too, the hard, brittle cobalt layer including the additional coating of gold or palladium (that it carries) cracks during a subsequent deep drawing or drawing and ironing. In this manner, the advantage of a brittle layer with regard to the electrical contact resistance of the band material can be combined with the advantage of a particularly good conductivity of the surface.

Furthermore, it is possible—before the deposition of the brittle layer with a high cobalt content—to coat the material with a layer with embedded, electrically conductive particles such as carbon particles. In this case, the subsequent cracking of the coating creates fissures that reach down to the electrically conductive particles in the material, by which process the particles are now partially located on the surface of the band material. In this variant, the positive properties of a coating with imbedded particles such as carbon particles with regard to conductivity are combined with the previously described positive properties of the coating with a high cobalt content that will be later cracked.

Another preferred variant of the procedure according to this invention proposes that the layer of cobalt or a cobalt alloy be applied onto both sides of the cold band, that both coatings occur in the same electrolyte bath but with different current densities so that the current density during the coating of the side that will later form the outer side of the battery shell is set up differently from the current density during the coating of the side that will later form the inner side of the battery shell. The additional layer on the subsequent outer side of the battery shell brings substantial advantages during the deep drawing or drawing and ironing of the battery shell because the danger for the particles to deposit on the deep-drawing tool is reduced. In this way, during a single treatment step the good drawing properties of a metal sheet with a cobalt coating are combined with good properties with regard to the performance of the final battery achieved due to the brittle coating on the inner side.

This result can also be achieved by first applying such a coating to at least the side of the cold band that will later form the outer side of the battery shell, that contains nickel grains of a smaller size due to, e.g., the addition of grain refining agents, and then homogenizing the material. A suitable grain-refining agent is, e.g., para toluol sulphonamide. In a second procedure step, i.e., after the homogenizing or possibly rerolling or killing, the above described brittle layer of cobalt or a cobalt alloy is applied on the side of the cold band that will later form the inner side of the battery shell. The thus produced material combines the material properties of the outer side advantageous for deep-drawing and drawing and ironing process with the required excellent contact capability on the inner side of the subsequently formed battery shell.

During the procedure according to this invention the organic ingredients in the electrolyte disintegrate into decomposition products due to the stream flowing in the electrolyte during the galvanization process. These decomposition products can react with other components of the galvanic bath, especially with metal ions. The thus obtained reaction products are deposited on the cold band together with other decomposition products and with the cobalt or cobalt alloy, and cause an imbrittlement of the coating. In case of organic substances containing sulfur or carbon, these reaction products might be, e.g., cobalt sulfides or cobalt carbides.

Among organic ingredients suitable for addition to the cobalt-containing electrolyte are brighteners known from the galvanic nickel-plating process. Also suitable are preferably brighteners called secondary brighteners. A typical example of this group is butyne diol. Galvanic deposits with these ingredients in the cobalt electrolyte bath result in a very hard and, at the same time, brittle coating, which is why the material tends to form strong cracks during the subsequent forming processes. The arising fissures are characterized by a relatively homogeneous structure with a lozenged shape of the individual fissure plates.

During the tests, after the cold band produced according to this invention has been subjected to a deep-drawing process, the average length of the plate edge turned out to be between 3 and 50 $\mu$m. The form and the edge length of the produced lozenge-shaped fissure plate is of decisive importance for the performance of the batteries subsequently manufactured from the band material.

In this connection, it is of a special advantage that, during the forming process to manufacture a battery shell, the brittle coating of the cold band produced by a procedure according to this invention always cracks in such a manner that the fissures run not in the longitudinal direction of the battery shell but rather at an angle of about 45° to this direction. This is of a particular importance, because during the manufacture of the batteries a cathode mass is pressed into the battery shell, which has been previously pressed into the so-called "pellets". These pellets are rings or disks made of a mixture of manganese dioxide, carbon, caustic potash solution and a binding agent. A functional contact for the conducting of electrons is endeavored during the pressing of the rings into the battery shell. Since during the forming process the band material produced by a procedure according to this invention forms fissures at an angle of 45° to the forming direction, during the pressing of the pellets into the battery shell a portion of the cathode mass can enter the fissures running at an angle to the pressing direction. This circumstance results in an especially good contact between the cathode mass and the inner side of the battery shell. This advantage of an improved contact is combined with the advantage of a good storage life of a battery shell coated with cobalt on its inner side. As a result, this allows manufacturing batteries that are characterized not only by an excellent contact of the cathode mass with the inner side of the battery shell due to the cracked surface, but also by an excellent storage life due to the cobalt coating. This applies accordingly also to a graphite layer arranged on this coating before the filling of the battery shell with the cathode mass, where, however, it is not the direct contact of the cathode mass with the battery shell but rather the contact of the graphite layer with the battery shell due to a strong anchoring of the graphite on the inner side of the battery shell.

FIG. 3 shows a table of examples of coated cold bands produced with the parameters of this invention. The organic ingredients to the electrolyte bath in FIG. 3 designated with V1 to V4 are as follows:

V1: butyne diol

V2: A mixture of butyne diol and saccharine. In the table of FIG. 3, in the cell "concentration" the first number relates to the concentration of butyne diol, and the second number relates to the concentration of saccharine.

V3: Para toluol sulfonamide

V4: Saccharin

In addition, FIG. 3 shows, among other things, the pH value, temperature, chloride content, the concentration and the current density of each particular electrolyte bath used. And finally, the table indicates each particular behavior of the coated cold band during the subsequent forming process of deep drawing or drawing and ironing as well as the average edge length of the lozenge-shaped fissure plates arising during the deep-drawing process. These edge lengths are, e.g., also illustrated in FIG. 2.

Figure 2:
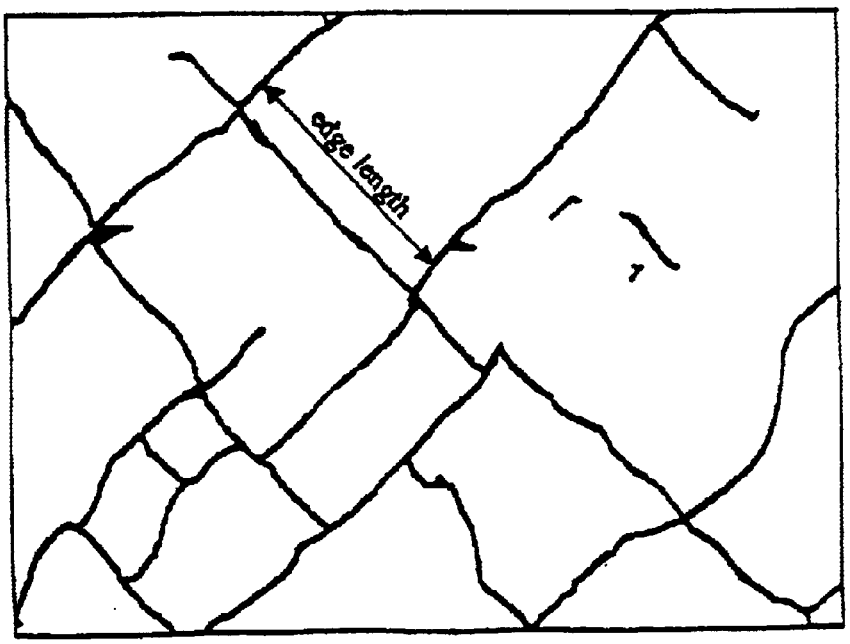

FIG. 1 shows an enlarged fissure pattern of example 27 marked with an "*" in FIG. 3, FIG. 2 shows example 9 marked with "**".

What is claimed is:

1. A process for manufacturing battery shells, comprising the steps of:
    depositing a nickel layer electrolytically on a cold band;
    coating the cold band with a cobalt-containing layer in a galvanic process, and
    forming the coated cold band into a battery shell,
    wherein, organic substances are added to the electrolyte that create decomposition products, and that these decomposition products and/or reaction products of these decomposition products with other components of the galvanic bath are deposited together with the cobalt-containing layer on the hand malarial as a brittle layer, and
    wherein the thus produced brittle coating laser cracks and forms fissure plates during the forming stop.

2. The process of claim 1, wherein the cold band comprises a steel type of a carbon content of less than 0.2% and of a thickness of up to 1 mm.

3. The process of claim 1, wherein the deposited nickel layer is first homogenized.

4. The process of claim 3, wherein a grain refining agent is added to the galvanic bath during the electrolytical depositing of the nickel layer contains electrically conductive particles.

5. The process of claim 1, wherein the nickel layer contains electrically conductive particles.

6. The process of claim 5, wherein the electrically conductive particles are carbon particles.

7. The process of claim 1, wherein the organic electrolyte ingredients are brighteners.

8. The process of claim 7, wherein the brightener comprises butyne diol.

9. The process of claim 1, wherein the current density of the electrolyte bath is less than 10 $A/dm^2$.

10. The process of claim 1, wherein the chloride content in the electrolyte bath is higher than 30 g/l.

11. The process of claim 1, wherein the cobalt coating layer is applied onto both sides of the cold band, with both coatings occurring in the same electrolyte bath but at different current densities, where the current density during the coating of the side that will later form the outer side of the battery shell is set up differently from the current density during the coating of the side that will later form the inner side of the battery shell.

12. The process of claim 1, wherein the cobalt-containing coating is applied using an electrolyte comprising cobalt.

13. The process of claim 1, wherein the cobalt-containing coating is applied using an electrolyte comprising a cobalt alloy.

14. The process of claim 13, wherein the cobalt content in the electrolytic coating is higher than 35 weight percent.

15. The process of claim 14, wherein the cobalt alloy comprises an admixture of nickel, iron, tin, indium, palladium, gold and/or bismuth.

16. The process of claim 14, wherein the nickel layer contains electrically conductive particles.

17. The process of claim 15, wherein the cold band comprises a steel type of a carbon content of less than 0.2% and of a thickness of up to 1 mm.

18. The process of claim 1, wherein the forming step comprises deep drawing.

19. The process if claim 1, wherein the forming step comprises drawing and ironing.

20. The process of claim 4, wherein the grain refining agent is para toluol sulfonamide.

21. The process of claim 16, wherein the electrically conductive particles are carbon particles.

22. The process of claim 17, wherein the nickel layer contains electrically conductive particles.

23. The process of claim 22, wherein the electrically conductive particles are carbon particles.

24. The process of claim 3, wherein the nickel layer contains electrically conductive particles.

25. The process of claim 24, wherein the electrically conductive particles are carbon particles.

26. The process of claim 7, wherein the brightener further comprises o-benzosulfimide (saccharine).

27. The process of claim 9, wherein the current density of the electrolyte bath is in the range of 6 to 8 $\Lambda/dm^2$.

28. The process of claim 6, wherein the organic electrolyte ingredients are brighteners.

29. The process of claim 28, wherein the current density of the electrolyte bath is less than 10 $\Lambda/dm^2$.

30. The process of claim 29, wherein the chloride content in the electrolyte bath is higher than 30 g/l.

31. The process of claim 30, wherein the cobalt coating layer is applied onto both sides of the cold band, with both coatings occurring in the same electrolyte bath but at different current densities, where the current density during the coating of the side that will later form the outer side of the battery shell is set up differently from the current density during the coating of the side that will later form the inner side of the battery shell.

32. A battery shell, characterized in that it is manufactured in a process according to claim 31.

* * * * *

UNITED STATES PATENT AND TRADEMARK OFFICE
CERTIFICATE OF CORRECTION

PATENT NO. : 6,923,897 B1
DATED : August 2, 2005
INVENTOR(S) : Ferdinand Schmidt et al.

It is certified that error appears in the above-identified patent and that said Letters Patent is hereby corrected as shown below:

Column 5,
Line 31, replace "hand malarial" with -- band material --.
Line 33, replace "laser" with -- layer --.
Line 34, replace "forming stop" with -- forming step --.
Lines 42-43, delete "contains electrically conductive particles".

Signed and Sealed this

Fourteenth Day of February, 2006

JON W. DUDAS
*Director of the United States Patent and Trademark Office*